(12) United States Patent
Alvarez-Icaza Rivera et al.

(10) Patent No.: US 10,650,301 B2
(45) Date of Patent: May 12, 2020

(54) UTILIZING A DISTRIBUTED AND PARALLEL SET OF NEUROSYNAPTIC CORE CIRCUITS FOR NEURONAL COMPUTATION AND NON-NEURONAL COMPUTATION

(71) Applicant: International Business Machines Corporation, Armonk, NY (US)

(72) Inventors: Rodrigo Alvarez-Icaza Rivera, Mountain View, CA (US); Rathinakumar Appuswamy, San Jose, CA (US); John V. Arthur, Mountain View, CA (US); Andrew S. Cassidy, San Jose, CA (US); Bryan L. Jackson, Fremont, CA (US); Paul A. Merolla, Palo Alto, CA (US); Dharmendra S. Modha, San Jose, CA (US); Jun Sawada, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 14/273,487

(22) Filed: May 8, 2014

(65) Prior Publication Data

US 2015/0324684 A1 Nov. 12, 2015

(51) Int. Cl.
*G06N 3/04* (2006.01)
*G06N 3/063* (2006.01)

(52) U.S. Cl.
CPC .............. *G06N 3/04* (2013.01); *G06N 3/049* (2013.01); *G06N 3/063* (2013.01)

(58) Field of Classification Search
None
See application file for complete search history.

(56) References Cited

U.S. PATENT DOCUMENTS 5,515,477 A * 5/1996 Sutherland ........... G06K 9/6232
128/925
2002/0181799 A1* 12/2002 Matsugu ............ G06K 9/00281
382/260

(Continued)

FOREIGN PATENT DOCUMENTS

WO 2009113993 A1 9/2009

OTHER PUBLICATIONS

Li et al. A Stochastic Digital Implementation of a Neural Network Controller for Small Wind Turbine Systems. IEEE Transactions on Power Electronics, vol. 21, No. 5, Sep. 2006.*

(Continued)

*Primary Examiner* — Alexey Shmatov
*Assistant Examiner* — Robert Bejcek, II
(74) *Attorney, Agent, or Firm* — Sherman IP LLP; Kenneth L. Sherman; Hemavathy Perumal

(57) ABSTRACT

Embodiments of the invention provide a neurosynaptic system comprising a delay unit for receiving and buffering axonal inputs, and a neural computation unit for generating neuronal outputs by performing a set of computations based on at least one axonal input received by the delay unit. The system further comprises a permutation unit for receiving external inputs to the system, and transmitting external outputs from the system. The permutation unit maps each external input received as either an axonal input to the delay unit or an external output from the system. The permutation unit maps each neuronal output generated by the neural computation unit as either an axonal input to the delay unit or an external output from the system. The neural computation unit comprises multiple electronic neurons, multiple electronic axons, and a plurality of electronic synapse devices interconnecting the neurons with the axons.

16 Claims, 9 Drawing Sheets

(56) References Cited

U.S. PATENT DOCUMENTS

| | | | |
|---|---|---|---|
| 2009/0187736 A1* | 7/2009 | Raichelgauz | G06N 3/063 |
| | | | 712/36 |
| 2011/0004579 A1* | 1/2011 | Snider | G06N 3/063 |
| | | | 706/25 |
| 2012/0084240 A1 | 4/2012 | Esser et al. | |
| 2013/0073495 A1 | 3/2013 | Izhikevich et al. | |
| 2013/0073497 A1* | 3/2013 | Akopyan | G06N 3/049 |
| | | | 706/27 |

OTHER PUBLICATIONS

Merolla et al. A Digital Neurosynaptic Core Using Embedded Crossbar Memory with 45pJ per Spike in 45nm. IEEE CICC 2011.*

Moore et al. Bluehive—A Field-Programable Custom Computing Machine for Extreme-Scale Real-Time Neural Network Simulation . 2012 IEEE 20th International Symposium on Field-Programmable Custom Computing Machines (Year: 2012).*

Cattell, Rick & Parker, Alice. (2012). Challenges for brain emulation: why is building a brain so difficult. Natural Intelligence: the INNS Magazine. 1. 17-31. (Year: 2012).*

Furber et al. High-Performance Computing for Systems of Spiking Neurons. 2006. (Year: 2006).*

Furber et al. Overview of the SpiNNaker System Architecture. IEEE Transactions on Computers, vol. 62, No. 12, Dec. 2013 (Year: 2013).*

Sharad, M. et al., "Proposal for Neuromorphic Hardware Using Spin Devices", Jun. 14, 2012, Cornell University Library, pp. 1-4, arXiv.org, United States.

Petkov, V. et al., "Belief Propagation with Factor Graphs on Neuromorphic Hardware", 2012, University of Heidelberg, Kirchhoff Institute of Physics, p. 1, Germany.

Misra, J. et al., "Artificial neural networks in hardware: A survey of two decades of progress", Dec. 2010, Neurocomputing, pp. 239-255, vol. 74, Issues 1-3, Elsevier, United States.

* cited by examiner

UTILIZING A DISTRIBUTED AND PARALLEL SET OF NEUROSYNAPTIC CORE CIRCUITS FOR NEURONAL COMPUTATION AND NON-NEURONAL COMPUTATION

This invention was made with Government support under HR0011-09-C-0002 awarded by Defense Advanced Research Projects Agency (DARPA). The Government has certain rights in this invention.

BACKGROUND

Embodiments of the invention relate to neuromorphic and synaptronic computation, and in particular, neuromorphic hardware for a specialized class of neuronal computation and non-neuronal computation.

Neuromorphic and synaptronic computation, also referred to as artificial neural networks, are computational systems that permit electronic systems to essentially function in a manner analogous to that of biological brains. Neuromorphic and synaptronic computation do not generally utilize the traditional digital model of manipulating 0s and 1s. Instead, neuromorphic and synaptronic computation create connections between processing elements that are roughly functionally equivalent to neurons of a biological brain. Neuromorphic and synaptronic computation may comprise various electronic circuits that are modeled on biological neurons.

In biological systems, the point of contact between an axon of a neural module and a dendrite on another neuron is called a synapse, and with respect to the synapse, the two neurons are respectively called pre-synaptic and post-synaptic. The essence of our individual experiences is stored in conductance of the synapses. The synaptic conductance may change with time as a function of the relative spike times of pre-synaptic and post-synaptic neurons, as per spike-timing dependent plasticity (STDP). The STDP rule increases the conductance of a synapse if its post-synaptic neuron fires after its pre-synaptic neuron fires, and decreases the conductance of a synapse if the order of the two firings is reversed.

BRIEF SUMMARY

Embodiments of the invention provide a neurosynaptic system comprising a delay unit for receiving and buffering axonal inputs, and a neural computation unit for generating neuronal outputs by performing a set of computations based on at least one axonal input received by the delay unit. The system further comprises a permutation unit for receiving external inputs to the system, and transmitting external outputs from the system. The permutation unit maps each external input received as either an axonal input to the delay unit or an external output from the system. The permutation unit maps each neuronal output generated by the neural computation unit as either an axonal input to the delay unit or an external output from the system. The neural computation unit comprises multiple electronic neurons, multiple electronic axons, and a plurality of electronic synapse devices interconnecting the neurons with the axons.

Another embodiment provides a method for computing computational functions. The method comprises receiving and buffering, via a delay unit, axonal inputs, and generating neuronal outputs by performing, via a neural computation unit, a set of computations based on at least one axonal input received. The method further comprises receiving, via a permutation unit, one or more external inputs, and transmitting, via the permutation unit, one or more external outputs. The permutation unit maps each external input received as one of an axonal input to the delay unit and an external output. The permutation unit further maps each neuronal output generated by the neural computation unit as one of an axonal input to the delay unit and an external output. The neural computation unit comprises multiple electronic neurons, multiple electronic axons, and a plurality of electronic synapse devices interconnecting the neurons with the axons.

These and other features, aspects and advantages of the present invention will become understood with reference to the following description, appended claims and accompanying figures.

DETAILED DESCRIPTION

Figure 1:
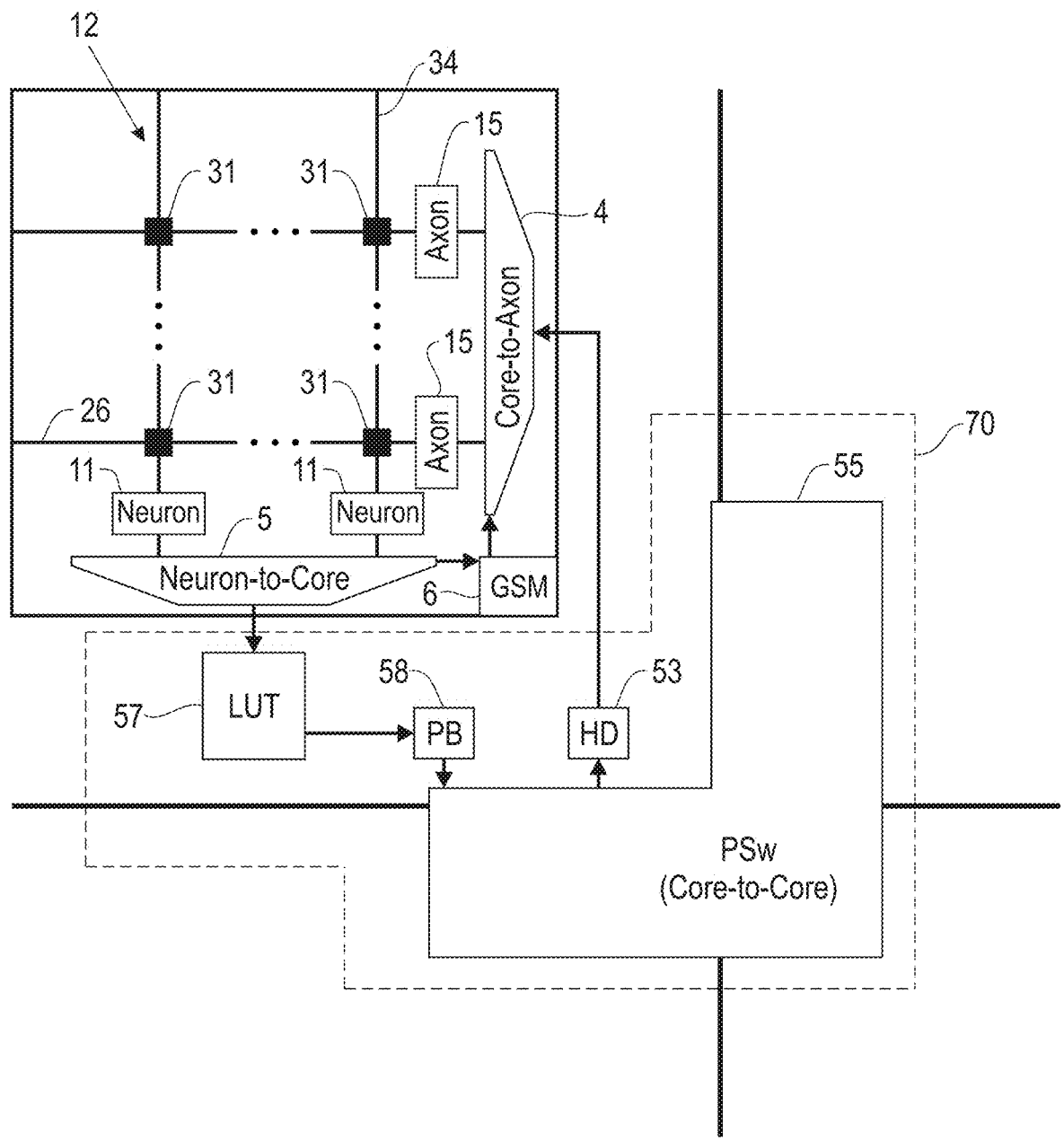
FIG. 1 illustrates an example neurosynaptic core circuit ("core circuit"), in accordance with an embodiment of the invention.

Embodiments of the invention provide a neurosynaptic system comprising a delay unit for receiving and buffering axonal inputs, and a neural computation unit for generating neuronal outputs by performing a set of computations based on at least one axonal input received by the delay unit. The system further comprises a permutation unit for receiving external inputs to the system, and transmitting external outputs from the system. The permutation unit maps each external input received as either an axonal input to the delay unit or an external output from the system. The permutation unit maps each neuronal output generated by the neural computation unit as either an axonal input to the delay unit or an external output from the system. The neural computation unit comprises multiple electronic neurons, multiple electronic axons, and a plurality of electronic synapse devices interconnecting the neurons with the axons.

In one embodiment, a neurosynaptic system comprises a system that implements neuron models, synaptic models, neural algorithms, and/or synaptic algorithms. In one embodiment, a neurosynaptic system comprises software components and/or hardware components, such as digital hardware, analog hardware or a combination of analog and digital hardware (i.e., mixed-mode).

The term electronic neuron as used herein represents an architecture configured to simulate a biological neuron. An electronic neuron is a processing element that is roughly functionally equivalent to neurons of a biological brain. As such, a neuromorphic and synaptronic computation comprising electronic neurons according to embodiments of the invention may include various electronic circuits that are modeled on biological neurons. Further, a neuromorphic and synaptronic computation comprising electronic neurons according to embodiments of the invention may include various processing elements (including computer simulations) that are modeled on biological neurons. Although certain illustrative embodiments of the invention are described herein using electronic neurons comprising electronic circuits, the present invention is not limited to electronic circuits. A neuromorphic and synaptronic computation according to embodiments of the invention can be implemented as a neuromorphic and synaptronic architecture comprising circuitry, and additionally as a computer simulation. Indeed, embodiments of the invention can take the form of an entirely hardware embodiment, an entirely software embodiment or an embodiment containing both hardware and software elements.

The term electronic axon as used herein represents an architecture configured to simulate a biological axon that transmits information from one biological neuron to different biological neurons. In one embodiment, an electronic axon comprises a circuit. An electronic axon is functionally equivalent to axons of a biological brain. As such, neuromorphic and synaptronic computation involving electronic axons according to embodiments of the invention may include various electronic circuits that are modeled on biological axons. Although certain illustrative embodiments of the invention are described herein using electronic axons comprising electronic circuits, the present invention is not limited to electronic circuits.

FIG. 1 illustrates an example neurosynaptic core circuit ("core circuit") 10, in accordance with an embodiment of the invention. The core circuit 10 comprises a plurality of electronic neurons ("neurons") 11 and a plurality of electronic axons ("axons") 15. The neurons 11 and the axons 15 are interconnected via an m×n crossbar 12 comprising multiple intra-core electronic synapse devices ("synapses") 31, multiple rows/axon paths 26, and multiple columns/dendrite paths 34, wherein "×" represents multiplication, and m and n are positive integers.

Each synapse 31 communicates firing events (e.g., spike events) between an axon 15 and a neuron 11. Specifically, each synapse 31 is located at cross-point junction between an axon path 26 and a dendrite path 34, such that a connection between the axon path 26 and the dendrite path 34 is made through the synapse 31. Each axon 15 is connected to an axon path 26, and sends firing events to the connected axon path 26. Each neuron 11 is connected to a dendrite path 34, and receives firing events from the connected dendrite path 34. Therefore, each synapse 31 interconnects an axon 15 to a neuron 11, wherein, with respect to the synapse 31, the axon 15 and the neuron 11 represent an axon of a pre-synaptic neuron and a dendrite of a post-synaptic neuron, respectively.

Each synapse 31 and each neuron 11 has configurable operational parameters. In one embodiment, the core circuit 10 is a uni-directional core, wherein the neurons 11 and the axons 15 of the core circuit 10 are arranged as a single neuron array and a single axon array, respectively. In another embodiment, the core circuit 10 is a bi-directional core, wherein the neurons 11 and the axons 15 of the core circuit 10 are arranged as two neuron arrays and two axon arrays, respectively. For example, a bi-directional core circuit 10 may have a horizontal neuron array, a vertical neuron array, a horizontal axon array and a vertical axon array, wherein the crossbar 12 interconnects the horizontal neuron array and the vertical neuron array with the vertical axon array and the horizontal axon array, respectively.

In response to the firing events received, each neuron 11 generates a firing event according to a neuronal activation function. A preferred embodiment for the neuronal activation function can be leaky integrate-and-fire.

An external two-way communication environment may supply sensory inputs and consume motor outputs. The neurons 11 and axons 15 are implemented using complementary metal-oxide semiconductor (CMOS) logic gates that receive firing events and generate a firing event according to the neuronal activation function. In one embodiment, the neurons 11 and axons 15 include comparator circuits that generate firing events according to the neuronal activation function. In one embodiment, the synapses 31 are implemented using 1-bit static random-access memory (SRAM) cells. Neurons 11 that generate a firing event are selected one at a time, and the firing events are delivered to target axons 15, wherein the target axons 15 may reside in the same core circuit 10 or somewhere else in a larger system with many core circuits 10.

As shown in FIG. 1, the core circuit 10 further comprises an address-event receiver (Core-to-Axon) 4, an address-event transmitter (Neuron-to-Core) 5, and a controller 6 that functions as a global state machine. The address-event receiver 4 receives firing events and transmits them to target axons 15. The address-event transmitter 5 transmits firing events generated by the neurons 11 to the core circuits 10 including the target axons 15.

The controller 6 sequences event activity within a time-step. The controller 6 divides each time-step into operational phases in the core circuit 10 for neuron updates, etc. In one embodiment, within a time-step, multiple neuron updates and synapse updates are sequentially handled in a read phase and a write phase, respectively. Further, variable time-steps may be utilized wherein the start of a next time-step may be triggered using handshaking signals whenever the neuron/synapse operation of the previous time-step is completed. For external communication, pipelining may be utilized wherein load inputs, neuron/synapse operation, and send outputs are pipelined (this effectively hides the input/output operating latency).

As shown in FIG. 1, the core circuit 10 further comprises a routing fabric 70. The routing fabric 70 is configured to selectively route neuronal firing events among core circuits 10. The routing fabric 70 comprises a firing events address lookup table module 57, a packet builder (PB) module 58, a head delete (HD) module 53, and a core-to-core packet switch 55. The LUT 57 is an N address routing table is configured to determine target axons 15 for firing events generated by the neurons 11 in the core circuit 10. The target axons 15 may be axons 15 in the same core circuit 10 or other core circuits 10. The LUT 57 retrieves information such as target distance, direction, addresses, and delivery times (e.g., about 19 bits/packet×4 packets/neuron). The LUT 57 converts firing events generated by the neurons 11 into forwarding addresses of the target axons 15.

The PB 58 packetizes the routing information retrieved by the LUT 57 into outgoing address-event packets. The core-to-core PSw 55 is an up-down-left-right mesh router configured to direct the outgoing address-event packets to the core circuits 10 containing the target axons 15. The core-to-core PSw 55 is also configured to receive incoming address-event packets from the core circuits 10. The HD 53 removes routing information from an incoming address-event packet to deliver it as a time stamped firing event to the address-event receiver 4.

In one example implementation, the core circuit 10 may comprise 256 neurons 11. The crossbar 12 may be a 256× 256 ultra-dense crossbar array that has a pitch in the range of about 0.1 nm to 10 μm. The LUT 57 of the core circuit 10 may comprise 256 address entries, each entry of length 32 bits.

In one embodiment, soft-wiring in the core circuit 10 is implemented using address events (e.g., Address-Event Representation). Firing event (i.e., spike event) arrival times included in address events may be deterministic or non-deterministic.

Although certain illustrative embodiments of the invention are described herein using synapses comprising electronic circuits, the present invention is not limited to electronic circuits.

Figure 2A:
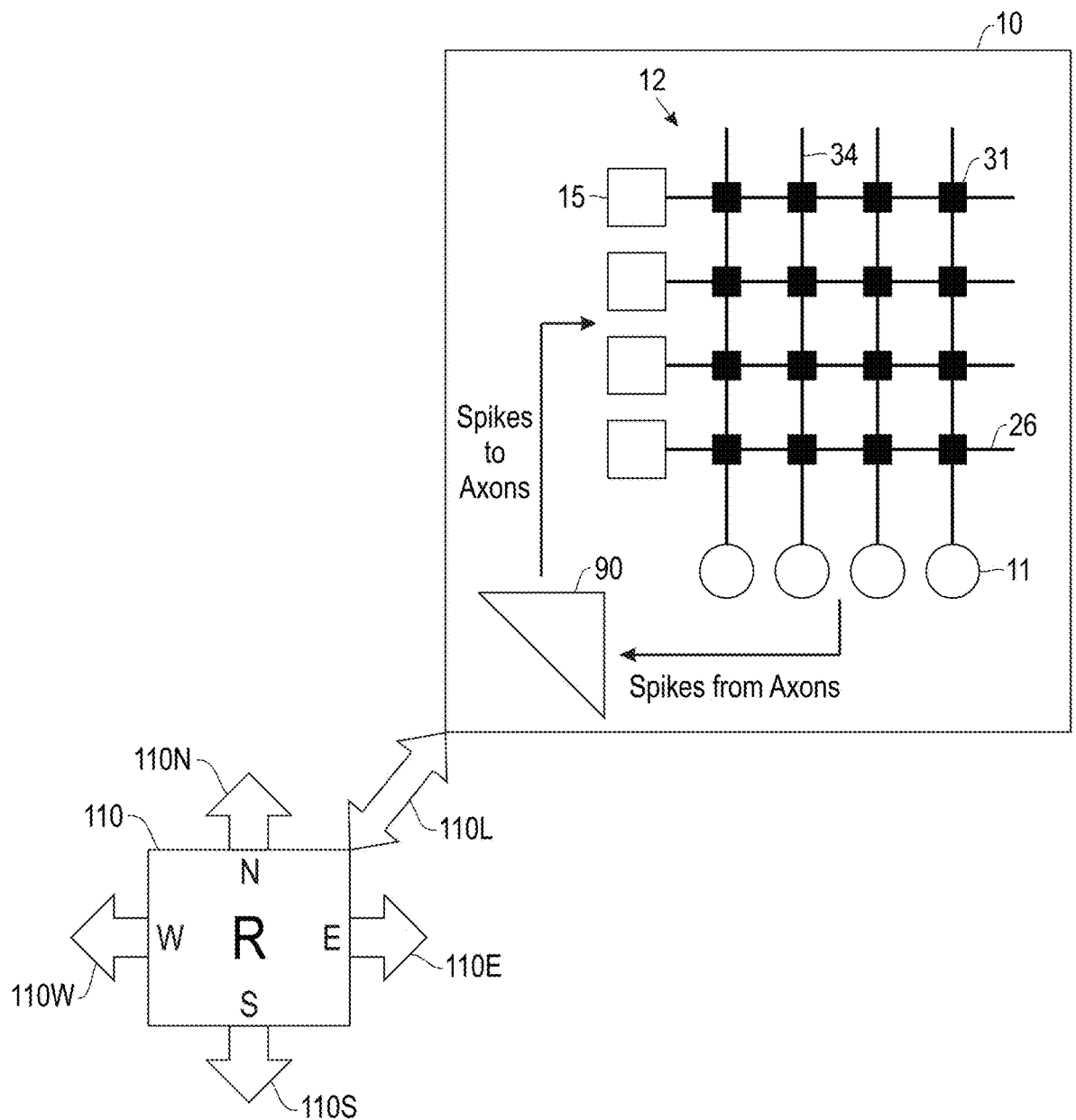
FIG. 2A illustrates an example core circuit interconnected with a corresponding packet router, in accordance with an embodiment of the invention.
Figure 2B:
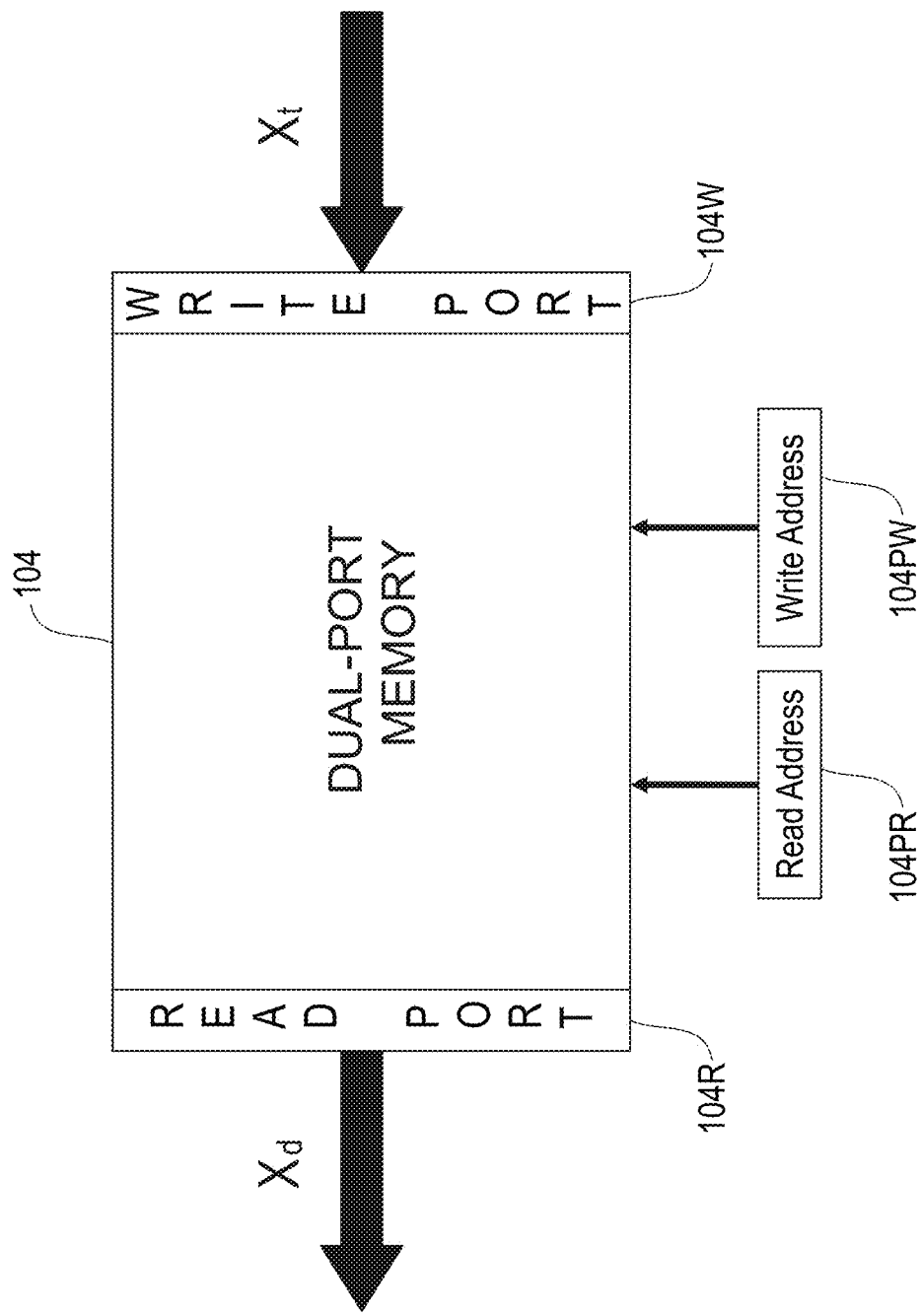
FIG. 2B illustrates an example scheduler delay buffer 105 for a core circuit 10, in accordance with an embodiment of the invention.

FIG. 2A illustrates an example core circuit 10 interconnected with a corresponding packet router 110, in accordance with an embodiment of the invention. In one embodiment, the LUT 57, the PB 58 and the HD 53 for the core circuit 10 may be implemented as a spike interface module 90 shown in FIG. 2A. The spike interface module 90 is configured to receive incoming address-event packets, wherein each incoming address-event packet includes an incoming firing event encoded as an address (e.g., an address represented as bits) representing a target axon 15. The spike interface module 90 decodes each incoming address-event packet received. The spike interface module 90 further comprises a scheduler delay buffer 105 (FIG. 2B). The decoded incoming firing events are temporarily held in the scheduler delay buffer 105. Each decoded incoming firing event is transmitted to a target axon 15 after a predetermined delivery delay indicating when the firing event should be delivered to the target incoming axon 15 has elapsed.

The spike interface module 90 is further configured to receive outgoing firing events generated by the neurons 11 in the core circuit 10. The spike interface module 90 encodes/encapsulates each outgoing firing event generated as an outgoing address-event packet having the address of a target incoming axon 15, and sends/routes the outgoing address-event packet to a core circuit 10 (e.g., the same core circuit 10 or a different core circuit 10) containing the target incoming axon 15.

In one embodiment, a corresponding core-to-core packet switch 55 for the core circuit 10 may be implemented as the packet router 110 shown in FIG. 2A. In one embodiment, each core circuit 10 receives address-event packets from other core circuits 10 via a corresponding packet router 110, and sends address-event packets to other core circuits 10 via the corresponding packet router 110. Specifically, the packet router 110 has a northbound channel 110N, a southbound channel 110S, an eastbound channel 110E, and a westbound channel 110W for passing along packets to neighboring components in the northbound, southbound, eastbound, and westbound directions, respectively. The packet router 110 also has a local channel 110L for receiving packets generated by the corresponding core circuit 10, and sending packets targeting the corresponding core circuit 10.

As shown in FIG. 2A, the local channel 110L interconnects the packet router 110 with the core circuit 10. The packet router 110 receives packets generated by the corresponding core circuit 10 via the local channel 110L, and sends packets targeting the corresponding core circuit 10 via the local channel 110L.

The northbound channel 110N interconnects the packet router 110 with an adjacent neighboring packet router 110 to the north of the packet router 110 ("north neighboring router"). The packet router 110 receives packets from the north neighboring packet router 110 via the northbound channel 110N, and sends packets to the north neighboring packet router 110 via the northbound channel 110N.

The southbound channel 110S interconnects the packet router 110 with an adjacent neighboring packet router 110 to the south of the packet router 110 ("south neighboring router"). The packet router 110 receives packets from the south neighboring packet router 110 via the southbound channel 110S, and sends packets to the south neighboring packet router 110 via the southbound channel 110S.

The eastbound channel 110E interconnects the packet router 110 with an adjacent neighboring packet router 110 to the east of the packet router 110 ("east neighboring router"). The packet router 110 receives packets from the east neighboring packet router 110 via the eastbound channel 110E, and sends packets to the east neighboring packet router 110 via the eastbound channel 110E.

The westbound channel 110W interconnects the packet router 110 with an adjacent neighboring packet router 110 to the west of the packet router 110 ("west neighboring router"). The packet router 110 receives packets from the west neighboring packet router 110 via the westbound channel 110W, and sends packets to the west neighboring packet router 110 via the westbound channel 110W.

FIG. 2B illustrates an example scheduler delay buffer 105 for a core circuit 10, in accordance with an embodiment of the invention. Each incoming firing event targeting an axon 15 of the core circuit 10 is decoded and temporarily held in the scheduler delay buffer 105. A decoded incoming firing event in the scheduler delay buffer 105 is transmitted to a target axon 15 only after a corresponding predetermined delivery delay indicating when the firing event should be delivered to the target incoming axon 15 has elapsed.

The scheduler delay buffer 105 comprises a dual port memory 104 for maintaining one or more decoded incoming firing events. In one embodiment, the dual port memory 104 is a circular buffer. The scheduler delay buffer 105 further comprises a read port 104R, a write port 104W, a read pointer register 104PR and a write pointer register 104PW. The read pointer register 104PR maintains a read address representing an address/location in the dual port memory 104 that is accessed on a subsequent read operation. Data read from the read address on a subsequent read operation is transmitted via the read port 104R. In one embodiment, the read address maintained is incremented by 1 during each time step.

The write pointer register 104PW maintains a write address representing an address/location in the dual port memory 104 that is accessed on a subsequent write operation. Data received via the write port 104W is written to the write address on a subsequent write operation.

During time step t, the write port 104W receives a corresponding axon input vector $X_t$ representing axon input for each axon of the core circuit 10. Each element of the axon input vector $X_t$ comprises a corresponding data value, a corresponding index and a corresponding delay value (i.e., a corresponding predetermined delivery delay). Each element of the axon input vector $X_t$ is written to the dual port memory 104 at a write address that is ahead of the read address by a corresponding delay value of the element (i.e., the write address is the sum of the read address and the corresponding delay value).

During time step t, a time delayed axon input vector $X_d$ is read from the dual port memory 104. Each element of the time delayed axon input vector $X_d$ is an element of an axon input vector received, via the write port 104W, during an earlier time step. Each element of the time delayed axon input vector $X_d$ represents a firing event for delivery to a target incoming axon 15 in time step t as a corresponding predetermined delivery delay has elapsed.

As described in detail later herein, the scheduler delay buffer 105 implements a delay permutation matrix D that provides the following: 1) a corresponding delay value for each element of an axon input vector, and 2) a sequence in which the read pointer register 104PR references addresses/locations in the dual port memory 104 that are accessed on subsequent read operations.

Figure 3:
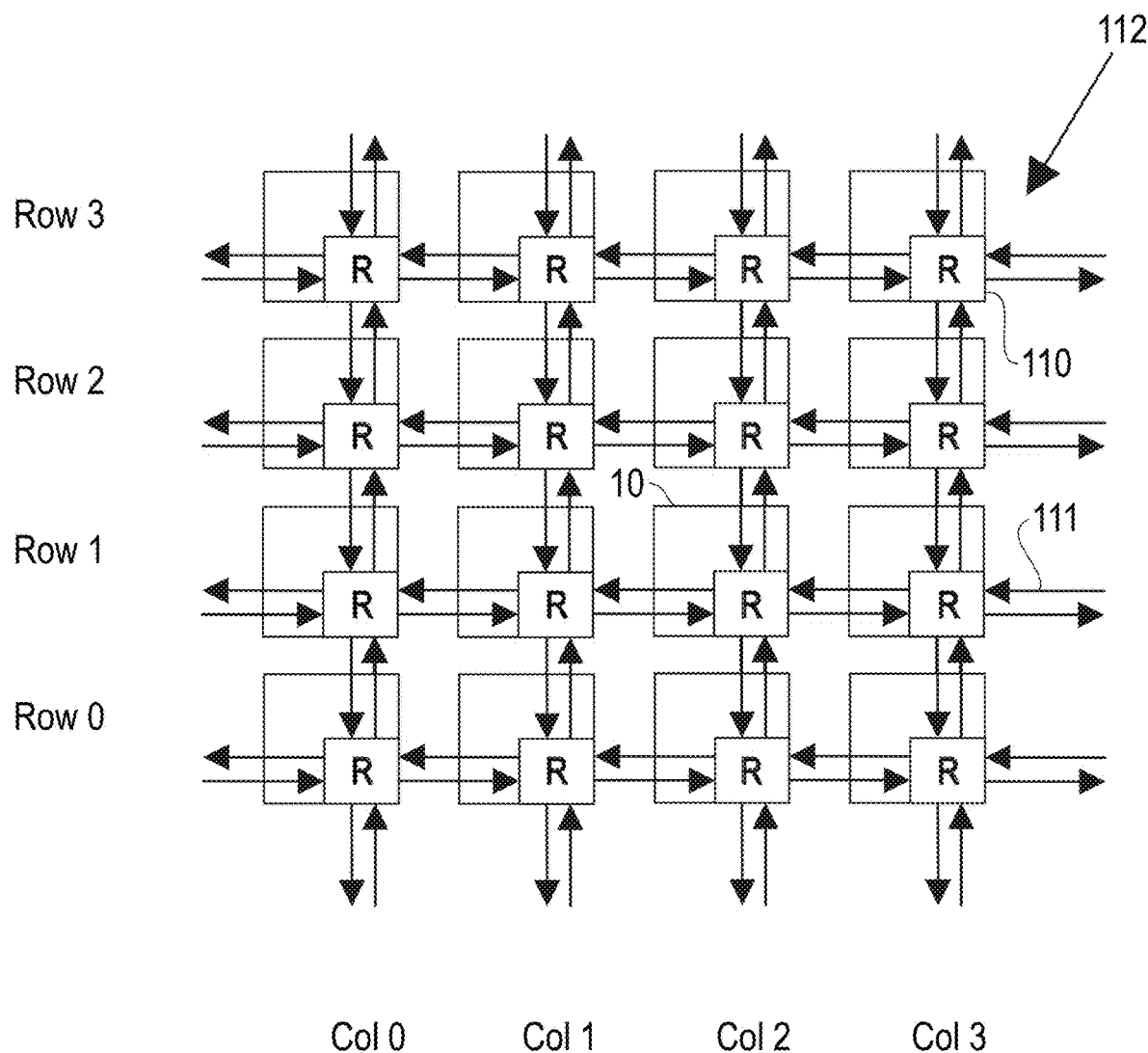
FIG. 3 illustrates an example neurosynaptic chip circuit ("chip circuit"), in accordance with an embodiment of the invention.

FIG. 3 illustrates an example neurosynaptic chip circuit ("chip circuit") 100, in accordance with an embodiment of the invention. The chip circuit 100 is a neurosynaptic network circuit comprising multiple interconnected core circuits 10. The chip circuit 100 is an example multi-core neurosynaptic network. In one embodiment, the core circuits 10 are arranged as a two-dimensional tile-able core array 112. Each core circuit 10 may be identified by its Cartesian coordinates as core circuit (x, y), where x is a column index and y is a row index of the core array 112 (i.e., core circuit, core circuit, . . . , (core 5,7)).

Each core circuit 10 has a corresponding packet router 110. The packet routers 110 of the chip circuit 100 are interconnected via multiple data paths (e.g., signal lines) 111. Relative to a packet router 110, each data path 111 is either an incoming data path 111 or an outgoing data path 111. Each incoming data path 111 has a reciprocal outgoing data path 111. Each channel 110L, 110N, 110S, 110E and 110W of a packet router 110 comprises at least one incoming data path 111 and at least one reciprocal outgoing data path 111.

The packet routers 110 facilitate inter-core communication. Each core circuit 10 utilizes a corresponding packet router 110 to pass along address-event packets in the eastbound, westbound, northbound, or southbound direction. Each packet router 110 receives packets from a neighboring component via at least one incoming data path 111, and sends packets to a neighboring component via at least one outgoing data path 111.

In one embodiment, an incoming data path 111 may have a buffer for maintaining incoming packets. For example, the incoming packets may be maintained in the buffer in a First In, First Out (FIFO) fashion.

As shown in FIG. 3, a packet router 110 may be interconnected to four different packet routers 110. For example, a northbound channel 110N, southbound channel 110S, an eastbound channel 110E, and a westbound channel 110W of a packet router 110 for the core circuit may be interconnected to a southbound channel 110S of a packet router 110 for the core circuit, a northbound channel 110N of a packet router 110 for the core circuit, a westbound channel 110W of a packet router 110 for the core circuit, and an eastbound channel 110E of a packet router 110 for the core circuit, respectively.

In one embodiment, the routing of address-event packets between the core circuits 10 of the chip circuit 100 may follow dimension order routing (for example, route east-west first, then route north-south). For example, a neuron 11 of the core circuit may generate a firing event targeting an axon 15 of the core circuit. To reach the core circuit, an address event packet including the firing event propagates from the packet router 110 for the core circuit to the packet router 110 for the core circuit via the packet routers 110 for the cores circuits, and in the eastbound direction and the packet routers 110 for the core circuits and in the southbound direction.

Figure 4:
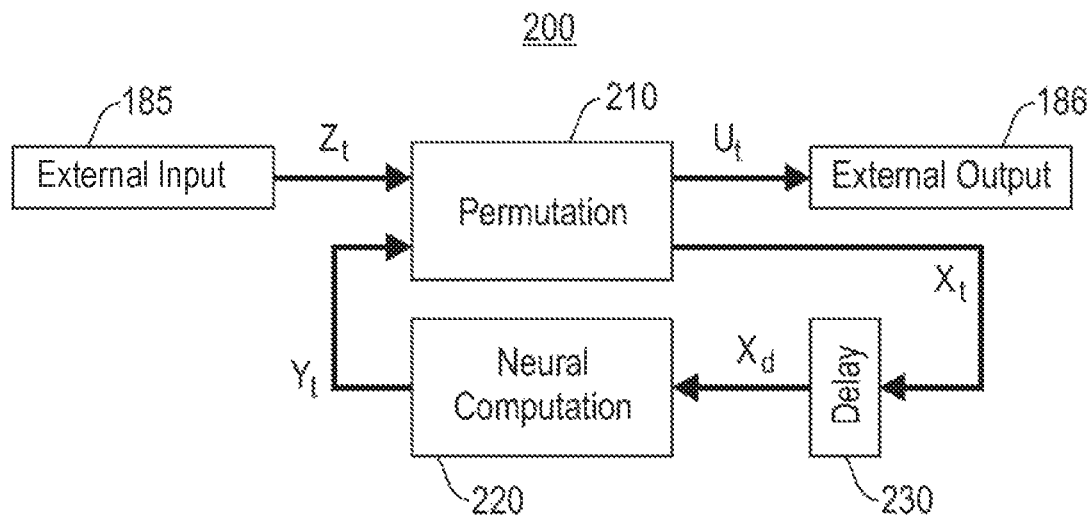
FIG. 4 illustrates an example computing system for computing different types of functions, in accordance with an embodiment of the invention.

FIG. 4 illustrates an example computing system 200 for computing different types of functions, in accordance with an embodiment of the invention. The system 200 comprises a permutation unit 210, a neural computation unit 220, and a delay unit 230. In one embodiment, the neural computation unit 220 utilizes at least one core circuit 10 for performing computational functions. For example, in one embodiment, the neural computation unit 220 performs a specialized class of neuronal computational functions and non-neuronal computational functions, including auto-regressive functions, linear functions and/or non-linear functions.

The system 200 further comprises at least one external input unit 185 and at least one external output unit 186. Each external input unit 185 provides one or more system-level inputs to the system 200. Each external output unit 186 receives one or more system-level outputs from the system 200. In one embodiment, the external input units 185 and the external output units 186 represent an external two-way communication environment for supplying sensory inputs and consuming motor outputs.

Table 1 below provides a listing of variables and/or parameters used in this specification.

TABLE 1

| Symbol | Parameter |
| --- | --- |
| C | Total number of core circuits in the system |
| $A_n$ | Total number of neurons per core circuit |
| $A_x$ | Total number of axons per core circuit |
| $A_d$ | Total number of delay slots per core circuit |
| t | Time step |
| N | Neuron index |
| $N_n$ | Total number of neurons in the system |
| $N_x$ | Total number of axons in the system |
| $M_i$ | Total number of inputs to the system ("system-level inputs") |
| $M_o$ | Total number of outputs from the system ("system-level outputs) |
| $V_t$ | An $N_n \times 1$ vector representing a neuron state of each neuron ("neuron state vector") |
| S | An $N_x \times N_n$ matrix representing a synaptic weight of each synapse ("synaptic weight matrix") |
| $X_t$ | An $N_x \times 1$ binary vector representing an axon input for each axon during time step t ("axon input vector") |
| $X_d$ | A time delayed version of $X_t$ |
| $Y_t$ | An $N_n \times 1$ binary vector representing a neuron output generated by each neuron during time step t ("neuron output vector") |
| Λ | An $N_n \times 1$ vector representing a leak rate parameter for each neuron ("leak vector") |

TABLE 1-continued

| Symbol | Parameter |
| --- | --- |
| T | An $N_n \times 1$ vector representing a threshold parameter for each neuron ("threshold vector") |
| $U_t$ | An $M_o \times 1$ vector representing system-level outputs during time step t ("system output vector") |
| $Z_t$ | An $M_i \times 1$ vector representing system-level inputs during time step t ("system input vector") |
| $P_{NM}$ | A $(N_n + M_i) \times (N_x + M_o)$ matrix for routing permutation ("routing permutation matrix") |
| D | An $N_x A_d \times N_x A_d$ matrix for delay permutation ("delay permutation matrix") |
| d | An $N_x(A_d - 1) \times 1$ vector representing a delay buffer for each axon ("delay buffer vector") |

The total number $N_n$ of neurons 11 in the system 200 is based on the total number $A_n$ of neurons 11 per core circuit 10 and the total number C of core circuits 10 in the system 200. The total number $N_n$ of neurons 11 in the system 200 is represented by equation (1) provided below:

$$N_n = A_n \times C \quad (1).$$

The total number $N_x$ of axons 15 in the system 200 is based on the total number $A_x$ of axons 15 per core circuit 10 and the total number C of core circuits 10 in the system 200. The total number $N_x$ of axons 15 in the system 200 is represented by equation (2) provided below:

$$N_x = A_x \times C \quad (2).$$

The permutation unit 210 implements the routing permutation matrix $P_{NM}$ for permuting/re-ordering the mapping of inputs (i.e., system-level inputs, axon inputs) to outputs (i.e., system-level outputs, neuron outputs). In one embodiment, the permutation unit 210 utilizes at least one packet router 110 of the core circuits 10 of the system 200.

The delay unit 230 implements the delay permutation matrix D for permuting/re-ordering the mapping of axon inputs to delay slots, wherein each delay slot corresponds to a specific time delay. In one embodiment, the delay unit 230 utilizes at least one scheduler delay buffer of the core circuits 10 of the system 200.

Table 2 below provides example pseudo code for implementing computation, permutation and delay operations in the system 200 in a non-linear manner.

TABLE 2

```
//COMPUTATION:
//For each neuron: integrate synaptic input into a corresponding neuron
//state and apply a corresponding leak parameter
V_{t+1} = V_t + S^T X_d - Λ;
//Threshold Operation:
//For neuron n: determine whether a corresponding neuron state reaches or
//exceeds a corresponding pre-determined threshold parameter
if (V_{t+1} (n) ≥T(n)) {
    //Reset a corresponding neuron state for neuron n
    V_{t+1} (n) = 0;
    //Neuron n spikes during time step t + 1
    Y_{t+1} (n) = 1;
}else {
    //A corresponding neuron state for neuron n reaches or exceeds a
    //corresponding pre-determined threshold
    //Neuron n does not spike during time step t + 1
    Y_{t+1} (n) = 0;
}
//PERMUTATION
P_{NM}^T[Y_{t+1}; Z_{t+1}] = [X_{t+1}; U_{t+1}];
//DELAY
D^T[X_{t+1}; d_t] = [d_{t+1}; X_d]
```

Table 3 below provides example pseudo code for implementing computation, permutation and delay operations in the system 200 in a linear manner.

TABLE 3

```
//COMPUTATION
//For each neuron: integrate synaptic input into a corresponding neuron
//state and apply a corresponding leak parameter
V_{t+1} = V_t + S^T X_d - Λ;
//Threshold Operation:
//For neuron n: determine whether a corresponding neuron state reaches
//or exceeds a corresponding pre-determined threshold parameter
if (V_{t+1} (n) ≥T(n)) {
    //Reset a corresponding neuron state for neuron n
    V_{t+1}(n) = V_{t+1}(n) - T(n);
    //Neuron n spikes during time step t + 1
    Y_{t+1} (n) = 1;
}else {
    //A corresponding neuron state for neuron n reaches or exceeds
    //a corresponding pre-determined threshold
    //Neuron n does not spike during time step t + 1
    Y_{t+1} (n) = 0;
}
//PERMUTATION
P_{NM}^T[Y_{t+1}; Z_{t+1}] = [X_{t+1}; U_{t+1}];
//DELAY
D^T[X_{t+1}; d_t] = [d_{t+1}; X_d]
```

As shown in Tables 2-3, permutation may be generally summarized using equation (3) provided below:

$$P_{NM}^T[Y_{t+1}; Z_{t+1}] = [X_{t+1}; U_{t+1}] \quad (3),$$

wherein $P_{NM}^T$ denotes a transpose of the permutation matrix $P_{NM}$, wherein $[Y_{t+1}; Z_{t+1}]$ denotes a concatenation of the neuron output vector $Y_{t+1}$ and the system input vector $Z_{t+1}$, and wherein $[X_{t+1}; U_{t+1}]$ denotes a concatenation of the axon input vector $X_{t+1}$ and the system output vector $U_{t+1}$.

In one embodiment, the example pseudo code in Tables 2-3 may be summarized as an auto-regressive process as provided in Table 4 below.

TABLE 4

$$V_{t+1} = F(V_t) + S^T(P_{NM}^T Y_{t+1}) - Λ$$
$$Y_{t+1} = F(V_{t+1})$$
$$P_{NM}^T[Y_{t+1}; Z_{t+1}] = [X_{t+1}; U_{t+1}]$$

In one embodiment, the function F( ) represents a threshold operation for implementing non-linear computation (e.g., the threshold operation defined in Table 2). In another embodiment, the function F( ) represents a threshold operation for implementing linear computation (e.g., the threshold operation defined in Table 3).

The system 200 in FIG. 4 represents a general configuration of performing computations in a recurrent manner, a feed-forward manner, or a hybrid of the recurrent manner and the feed-forward manner. The manner in which the computations are performed depends on the configuration of the routing permutation matrix $P_{NM}$.

Figure 5:
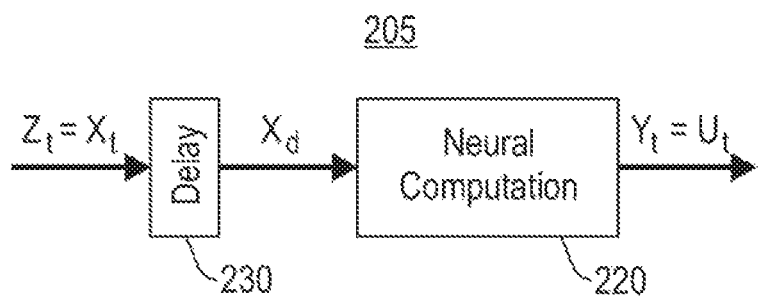
FIG. 5 illustrates an example computing system representing a fully feed-forward configuration, in accordance with an embodiment of the invention.

FIG. 5 illustrates an example computing system 205 representing a fully feed-forward configuration, in accordance with an embodiment of the invention. The system 205 comprises a neural computation unit 220 and a delay unit 230. The system 205 performs computations in a fully feed-forward manner, wherein all system-level outputs of a system output vector $U_t$ are based only on system-level inputs of a system input vector $Z_t$ and a set of computational functions performed by the neural computation unit 220. The system 205 represents a special case of the system 200, wherein the permutation unit 210 of the system 200 is configured to implement the following mapping operations:

1) map all system-level inputs provided by the external input units 185 as axon inputs for the delay unit 230, and 2) map all neuron outputs generated by the neural computation unit 220 as system-level outputs for the external output units 186.

For example, in the fully feed-forward configuration, system-level inputs of a system input vector $Z_{t+1}$ are provided as axon inputs of an axon input vector $X_{t+1}$, and neuron outputs of a neuron output vector $Y_{t+1}$ are provided as system-level outputs of a system output vector $U_{t+1}$, as represented by equations (4) and (5), respectively, provided below:

$$X_{t+1} = Z_{t+1} \qquad (4),$$

and $$U_{t+1} = Y_{t+1} \qquad (5).$$

Table 5 below provides an auto-regressive process for a fully feed-forward configuration.

TABLE 5

$V_{t+1} = F(V_t) + S^T Z_{t+1} - \Lambda$
$U_{t+1} = Y_{t+1} = F(V_{t+1})$

Figure 6:
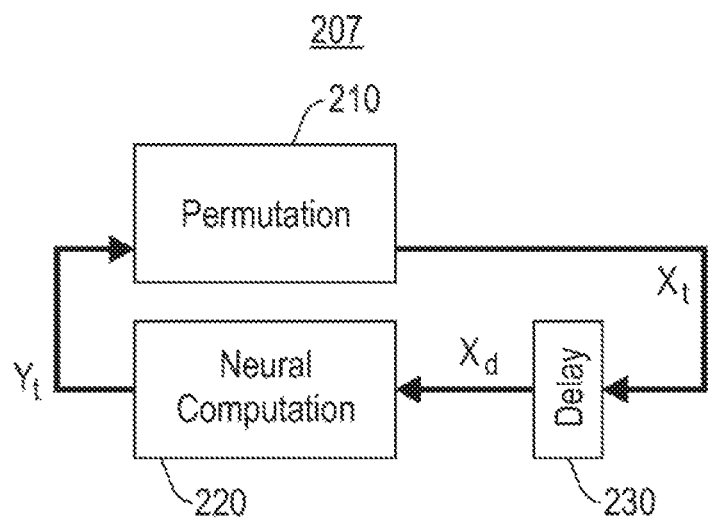
FIG. 6 illustrates an example computing system representing a fully recurrent configuration, in accordance with an embodiment of the invention.

FIG. 6 illustrates an example computing system 207 representing a fully recurrent configuration, in accordance with an embodiment of the invention. The system 207 comprises a permutation unit 210, a neural computation unit 220, and a delay unit 230. The system 207 performs computations in a fully recurrent manner, wherein past computations performed by the neural computation unit 220 are taken into consideration for future computations. The total number of system-level inputs $M_i$ and the total number of system-level outputs $M_o$ are both zero. Neuron outputs of a neuron output vector $Y_t$ previously generated by the neural computation unit 220 are provided as axon inputs of an axon input vector $X_{t+1}$ for the next round of computations. The system 207 represents a special case of the system 200, wherein the permutation unit 210 of the system 200 is configured to implement the following mapping operation: map all neuron outputs generated by the neural computation unit 220 as axon inputs for the delay unit 230.

For example, in the fully recurrent configuration, permutation is represented by equation (6) provided below:

$$P_{NM}^T [Y_{t+1}] = [X_{t+1}] \qquad (6).$$

Table 6 below provides an auto-regressive process for a fully recurrent configuration.

TABLE 6

$V_{t+1} = F(V_t) + S^T(P_{NM}^T Y_{t+1}) - \Lambda$
$Y_{t+1} = F(V_{t+1})$

Figure 7:
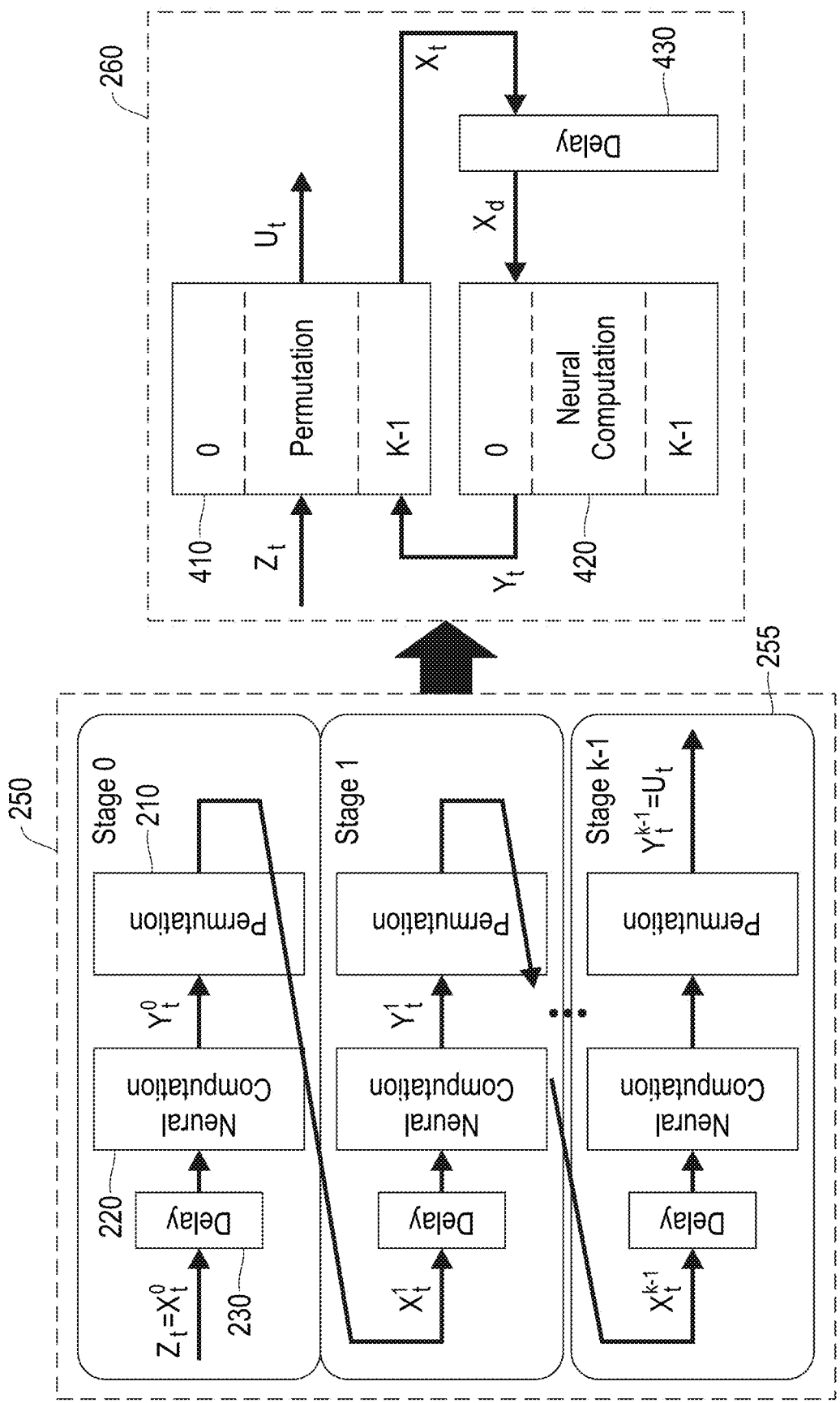
FIG. 7 illustrates an example computing system for implementing a multi-layer computing system representing a fully feed-forward configuration, in accordance with an embodiment of the invention.

FIG. 7 illustrates an example computing system 260 for implementing a multi-layer computing system 250 representing a fully feed-forward configuration, in accordance with an embodiment of the invention. The computing system 250 comprises multiple layers (i.e., blocks) 255. Each layer 255 comprises a corresponding permutation unit 210, a corresponding neural computation unit 220, and a corresponding delay unit 230. Each neural computation unit 220 of each layer 255 performs a corresponding set of computational functions. For example, as shown in FIG. 7, a first layer 255 labeled as Stage 0 performs a first stage of computations, a second layer 255 labeled as Stage 1 performs a second stage of computations, . . . , and a last layer 255 labeled as Stage k-1 performs a final stage of computations, wherein k is a positive integer. System-level inputs of a system input vector $Z_t$ to the system 250 are provided as axon inputs of an axon input vector $X_t^0$ for the first stage of computations. With the exception of the final stage of computations, neurons outputs of a neuron output vector $Y_t^i$ generated by an $i^{th}$ stage of computations are provided as axon inputs of an axon input vector $X_t^{i+1}$ for the $(i+1)^{th}$ stage of computations, wherein $1 \leq i \leq k-1$. Neurons outputs of a neuron output vector $Y_t^{k-1}$ generated by the final stage of computations are provided as system-level outputs of a system output vector $U_t$ for the system 250.

In one embodiment, the system 250 may be implemented as the system 260 representing an example hybrid configuration for performing computations in a recurrent manner and a feed-forward manner. Based on the routing permutation matrix included in the permutation unit 410, the systems 250 and 260 are logically and mathematically equivalent. Therefore, a multi-layer system such as the system 250 may be mapped directly to the system 260 and the system 200.

The permutation unit 410 implements a routing permutation matrix $P_{NM}$ representing a concatenation of multiple permutation matrices $P_{NM}$. Specifically, the routing permutation matrix $P_{NM}$ implemented by the permutation unit 410 represents a concatenation of each routing permutation matrix $P_{NM}$ implemented by each permutation unit 210 of each layer 255 of the system 250. Therefore, the routing permutation matrix $P_{NM}$ implemented by the permutation unit 410 represents a concatenation of a first routing permutation matrix $P_{NM}^0$ implemented by a permutation unit 210 of the first layer 255, a second routing permutation matrix $P_{NM}^1$ implemented by a permutation unit 210 of the second layer 255, . . . , and k-1 routing permutation matrix $P_{NM}^{k-1}$ implemented by a permutation unit 210 of the last layer 255.

Similarly, the neural computation unit 420 implements a neural computation matrix representing a concatenation of multiple neural computation matrices. Specifically, the neural computation matrix implemented by the computation unit 420 represents a concatenation of each neural computation matrix implemented by each computation unit 220 of each layer 255 of the system 250.

There are several different types of neural computation matrices, such as a synaptic weight matrix S, a leak vector $\Lambda$, a threshold vector T, and a neuron state vector V. Each neural computation matrix is composed by concatenating submatrices/subvectors from different layers of computation.

Figure 8:
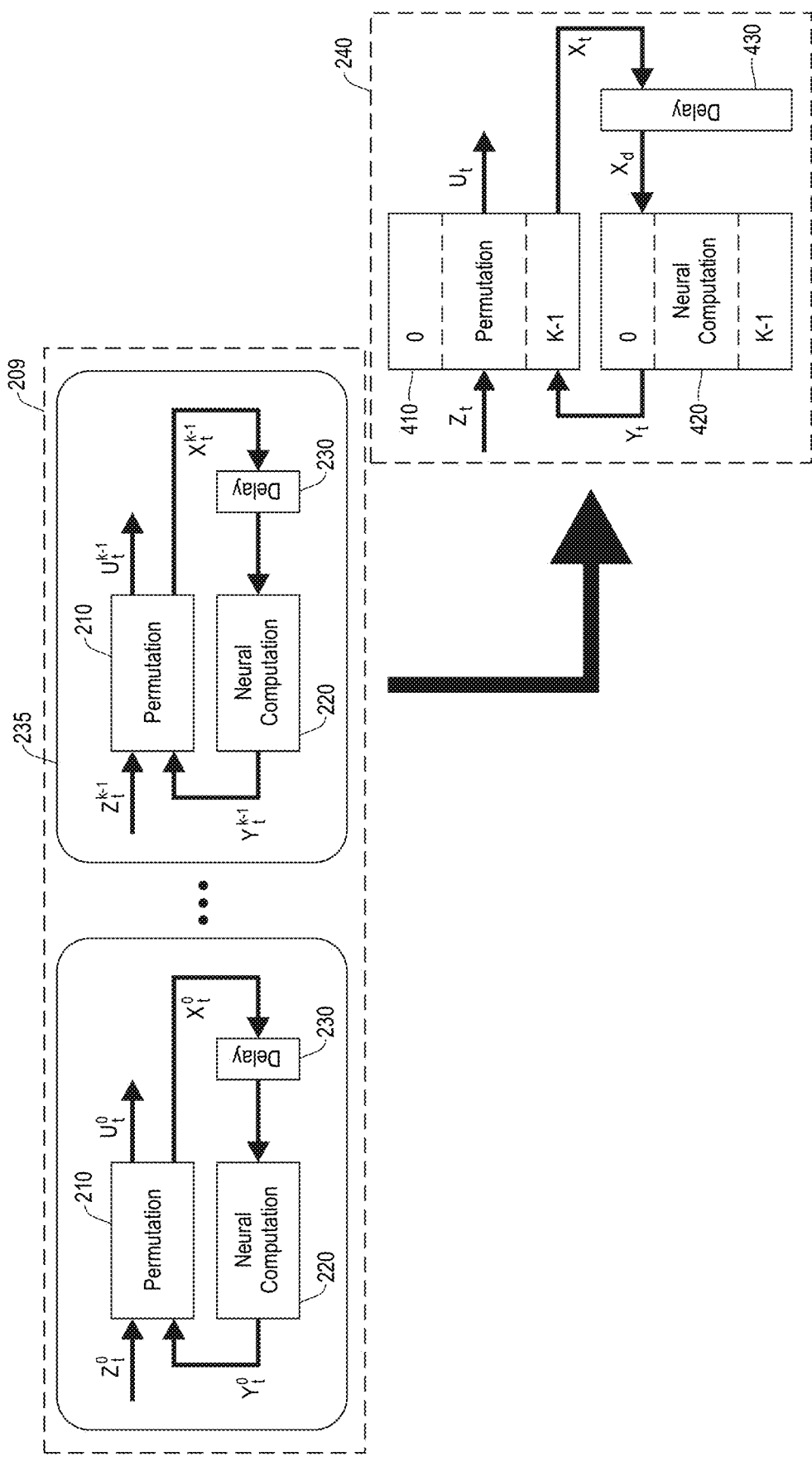
FIG. 8 illustrates an example computing system for implementing a multi-layer computing system representing a fully recurrent configuration, in accordance with an embodiment of the invention.

FIG. 8 illustrates an example computing system 240 for implementing a multi-layer computing system 209 representing a hybrid recurrent/feed-forward configuration, in accordance with an embodiment of the invention. The computing system 209 comprises multiple layers (i.e., blocks) 235. Each layer 235 comprises a corresponding permutation unit 210, a corresponding neural computation unit 220, and a corresponding delay unit 230. Each layer 235 receives a corresponding set of system-level inputs and provides a corresponding set of system-level outputs. For example, as shown in FIG. 8, a first layer 235 receives system-level inputs of a system input vector $Z_t^0$ and provides system-level outputs of a system output vector $U_t^0$, a second layer 235 receives system-level inputs of a system input vector $Z_t^1$ and provides system-level outputs of a system output vector $U_t^1$, . . . , and a last layer 235 receives system-level inputs of a system input vector $Z_t^{k-1}$ and provides system-level outputs of a system output vector $U_t^{k-1}$, wherein k is a positive integer. Each layer 235 may operate in a recurrent manner, a feed-forward manner, or a hybrid combination of the recurrent manner and the feed-forward manner.

Based on the routing permutation matrix of the permutation unit 410, the system 209 and the system 240 are logically and mathematically equivalent. A hybrid multi-layer system, such as the system 209, may be mapped directly to the system 240 and the system 200.

The permutation unit 410 implements a routing permutation matrix $P_{NM}$ representing a concatenation of multiple routing permutation matrices $P_{NM}$. Specifically, the routing permutation matrix $P_{NM}$ implemented by the permutation unit 410 represents a concatenation of each routing permutation matrix $P_{NM}$ implemented by each permutation unit 210 of each layer 235 of the system 209. Therefore, the routing permutation matrix $P_{NM}$ implemented by the permutation unit 410 represents a concatenation of a first routing permutation matrix $P_{NM}^0$ implemented by a permutation unit 210 of the first layer 235, a second routing permutation matrix $P_{NM}^1$ implemented by a permutation unit 210 of the second layer 235, . . . , and k−1 routing permutation matrix $P_{NM}^{k-1}$ implemented by a permutation unit 210 of the last layer 235.

Similarly, the neural computation unit 420 implements a neural computation matrix representing a concatenation of multiple submatrices/subvectors from different layers of computation. Specifically, the neural computation matrix implemented by the computation unit 420 represents a concatenation of each neural computation matrix implemented by each computation unit 220 of each layer 235 of the system 209.

In this specification, let the term exact permutation matrix denote a square binary matrix satisfying the following constraints: (1) for each row of the matrix, each entry of the row is 0 with the exception of exactly one entry that is 1, and (2) for each column of the matrix, each entry of the column is 0 with the exception of exactly one entry that is 1.

An example exact permutation matrix $P_1$ represented in form (7) is provided below:

$$P_1 \begin{bmatrix} 0 & 0 & 1 \\ 1 & 0 & 0 \\ 0 & 1 & 0 \end{bmatrix} = (7).$$

In one embodiment, a permutation unit 210/410 implements one-to-one mapping of neuron outputs and system-level inputs to axon inputs and system-level outputs, respectively. One-to-one mapping is implemented when the following condition is satisfied: the sum of the total number of system-level inputs $M_i$ and the total number of neuron outputs $N_n$ is equal to the sum of the total number of axons $N_x$ and the total number system-level outputs $M_o$ (i.e., $M_i+N_n=N_x+M_o$). Therefore, the number of sources in the system must equal the number of destinations in the system. For example, this is satisfied when: (1) the total number $N_x$ of axons 15 is equal to the total number $N_n$ of neurons 11, and (2) the total number $M_i$ of system-level inputs is equal to the total number $M_o$ of system-level outputs. Therefore, each target axon 15 has a corresponding source neuron 11 wherein neuron output generated by the source neuron 11 is routed to the target axon 15. The routing permutation matrix $P_{NM}$ implemented by the permutation unit 210/410 is an exact permutation matrix.

For example, in one embodiment, the routing permutation matrix $P_{NM}$ is the example exact permutation matrix $P_1$ represented in form (7) above. The permutation matrix P may be used to implement one-to-one mapping between an example input vector $I_1$ and an example output vector $O_1$, wherein each vector $I_1$, $O_1$ has the same number of entries. For each $ij^{th}$ entry of the permutation matrix $P_1$ that is 1, the $ij^{th}$ entry maps the $i^{th}$ entry of the input vector $I_1$ to the $j^{th}$ entry of the output vector $O_1$, wherein i and j are both integers.

For example, assume the input vector $I_1$ and the output vector $O_1$ represent three inputs and three outputs, respectively. An example mapping of the input vector $I_1$ to the output vector $O_1$ using the permutation matrix $P_1$ is provided by equation (8) provided below.

$$P_1^T I_1 = O_1 \qquad (8)$$

$$= \begin{bmatrix} 0 & 1 & 0 \\ 0 & 0 & 1 \\ 1 & 0 & 0 \end{bmatrix} \begin{bmatrix} A \\ B \\ C \end{bmatrix} = \begin{bmatrix} B \\ C \\ A \end{bmatrix},$$

wherein $P_1^T$ denotes a transpose of the permutation matrix $P_1$. In the example mapping provided by equation (8), a first input, a second input, and a third input of the input vector $I_1$ is mapped to a third output, a first output, and a second output of the output vector $O_1$, respectively.

In one embodiment, a permutation unit 210/410 of a computing system implements routing fan-in when the total number of destinations in the system (i.e., $N_x+M_o$) is less than the total number sources in the system (i.e., $N_n+M_i$). The routing permutation matrix $P_{NM}$ for the permutation unit 210/410 is a non-square binary matrix satisfying the following constraints: (1) the number of rows in the matrix is greater than the number of columns in the matrix, (2) for each row of the matrix, exactly one entry of the row is 1 and all remaining entries of the row is 0, and (3) for each column of the matrix, at least one entry of the column is 1 and all remaining entries of the column is 0. For example, a 4×3 matrix $P_2$, as represented in form (9) provided below, may be used as the routing permutation matrix $P_{NM}$:

$$P_2 = \begin{bmatrix} 0 & 0 & 1 \\ 1 & 0 & 0 \\ 0 & 1 & 0 \\ 0 & 1 & 0 \end{bmatrix}. \qquad (9)$$

The permutation matrix $P_2$ maps inputs of an example input vector $I_2$ to outputs of an example output vector $I_2$ using fan-in mapping. Each entry of the input vector $I_2$ and each entry of the output vector $O_2$ corresponds to an input and an output, respectively. The number of entries in the input vector $I_2$ is greater than the number of entries in the output vector $O_2$. For example, assume the input vector $I_2$ comprises four entries and the output vector $O_2$ comprises three entries. An example mapping between the input vector $I_2$ and the output vector $O_2$ using the permutation matrix $P_2$ is represented by equation (10) provided below.

$$P_2^T I_2 = O_2 \qquad (10)$$

$$= \begin{bmatrix} 0 & 1 & 0 & 0 \\ 0 & 0 & 1 & 1 \\ 1 & 0 & 0 & 0 \end{bmatrix} \begin{bmatrix} A \\ B \\ C \\ D \end{bmatrix} = \begin{bmatrix} B \\ C+D \\ A \end{bmatrix},$$

wherein $P_2^T$ denotes a transpose of the permutation matrix $P_2$. In the example mapping provided by equation (10) above, the first entry (A) and the second entry (B) of the input vector $I_2$ is mapped to the third entry and the first entry of the output vector $O_2$, respectively. Further, both the third entry (C) and the fourth entry (D) of the input vector $I_2$ are mapped to the second entry of the output vector $O_2$, wherein the second entry of the output vector $O_2$ comprises the sum of the third entry and the fourth entry of the input vector $I_2$.

In one embodiment, a permutation unit 210/410 of a computing system implements routing fan-out when the total number of destinations in the system (i.e., $N_x+M_o$) is greater than the total number of sources in the system (i.e., $N_n+M_i$). The routing permutation matrix $P_{NM}$ for the permutation unit 210/410 is a non-square binary matrix satisfying the following constraints: (1) the number of rows in the matrix is less than the number of columns in the matrix, (2) for each column of the matrix, exactly one entry of the column is 1 and all remaining entries of the column is 0, and (3) for each row of the matrix, at least one entry of the row is 1 and all remaining entries of the row is 0. For example, a 3×4 matrix $P_3$, as represented in form (11) provided below, may be used as the routing permutation matrix $P_{NM}$:

$$P_3 = \begin{bmatrix} 0 & 0 & 1 & 0 \\ 1 & 0 & 0 & 0 \\ 0 & 1 & 0 & 1 \end{bmatrix}. \tag{11}$$

The permutation matrix $P_3$ maps inputs of an example input vector $I_3$ to outputs of an example output vector $O_3$ using fan-out mapping. Each entry of the input vector $I_3$ and each entry of the output vector $O_3$ corresponds to an input and an output, respectively. The number of entries in the input vector $I_3$ is less than the number of entries in the output vector $O_3$. For example, assume the input vector $I_3$ comprises three entries and the output vector $O_3$ comprises four entries. An example mapping between the input vector $I_3$ and the output vector $O_3$ using the permutation matrix $P_3$ is represented by equation (12) provided below:

$$P_3^T I_3 = O_3 \tag{12}$$

$$= \begin{bmatrix} 0 & 1 & 0 \\ 0 & 0 & 1 \\ 1 & 0 & 0 \\ 0 & 0 & 1 \end{bmatrix} \begin{bmatrix} A \\ B \\ C \end{bmatrix} = \begin{bmatrix} B \\ C \\ A \\ C \end{bmatrix},$$

wherein $P_3^T$ denotes a transpose of the permutation matrix $P_3$. In the example mapping provided by equation (12) above, the first entry (A) and the second entry (B) of the input vector $I_3$ is mapped to the third entry and the first entry of the output vector $O_3$, respectively. Further, the third entry (C) of the input vector $I_3$ is mapped to both the second entry and the fourth entry of the output vector $O_3$.

In one embodiment, a permutation unit 210/410 of a computing system implements both routing fan-in and routing fan-out. By implementing both routing fan-in and routing fan-out, the total number destinations in the system (i.e., $N_x+M_o$) may be less than, equal to, or greater than the total number sources in the system (i.e., $N_n+M_i$). The routing permutation matrix $P_{NM}$ for the permutation unit 210/410 is a binary matrix satisfying the following constraints: (1) for each row of the matrix, at least one entry of the row is 1 and all remaining entries of the row is 0, and (2) for each column of the matrix, at least one entry of the column is 1 and all remaining entries of the column is 0. For example, a 3×3 matrix $P_4$, as represented in form (13) provided below, may be used as the routing permutation matrix $P_{NM}$:

$$P_4 = \begin{bmatrix} 0 & 1 & 1 \\ 1 & 0 & 0 \\ 0 & 1 & 1 \end{bmatrix}. \tag{13}$$

The permutation matrix $P_4$ maps inputs of an example input vector $I_4$ to outputs of an example output vector $O_4$ using both fan-in mapping and fan-out mapping. Each entry of the input vector $I_4$ and each entry of the output vector $O_4$ corresponds to an input and an output, respectively. The number of entries in the input vector $I_4$ is may be less than, equal to, or greater than the number of entries in the output vector $O_4$. For example, assume the input vector $I_4$ comprises three entries and the output vector $O_4$ comprises three entries. An example mapping between the input vector $I_4$ and the output vector $O_4$ using the permutation matrix $P_4$ is represented by equation (14) provided below.

$$P_4^T I_4 = O_4 \tag{14}$$

$$= \begin{bmatrix} 0 & 1 & 0 \\ 1 & 0 & 1 \\ 1 & 0 & 0 \end{bmatrix} \begin{bmatrix} A \\ B \\ C \end{bmatrix} = \begin{bmatrix} B \\ A+C \\ A \end{bmatrix},$$

wherein $P_4^T$ denotes a transpose of the permutation matrix $P_4$. In the example mapping provided by equation (14) above, the first entry (A) and the second entry (B) of the input vector $I_4$ is mapped to the third entry and the first entry of the output vector $O_4$, respectively. Further, the third entry (C) of the input vector $I_4$ is mapped to the second entry of the output vector $O_4$, wherein the second entry of the output vector $O_4$ is the sum of the first entry and the third entry of the input vector $I_4$. The first column of the matrix $P_4^T$ comprises multiple entries that are 1 for fan-out mapping the first entry (A) of the input vector $I_4$. The second row of the matrix $P_4^T$ comprises multiple entries that are 1 for fan-in mapping the sum of the first entry and the third entry of the input vector $I_4$ to the second entry of the output vector $O_4$.

Figure 9A:
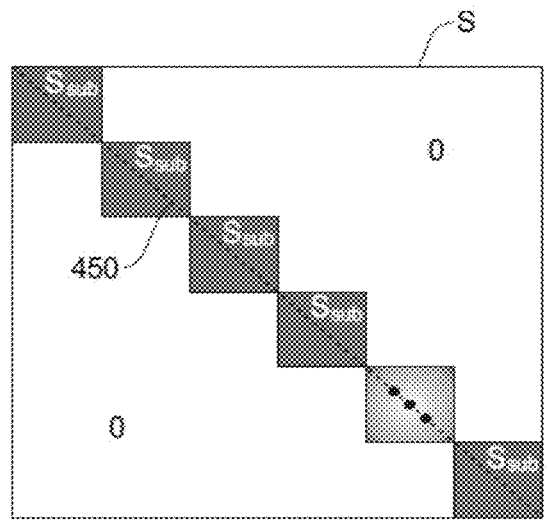
FIG. 9A illustrates an example synaptic weight matrix, in accordance with an embodiment of the invention.

FIG. 9A illustrates an example synaptic weight matrix S, in accordance with an embodiment of the invention. The synaptic weight matrix S for a computing system is an $N_x \times N_n$ block diagonal matrix comprising multiple block diagonal submatrices $S_{sub}$ positioned along a diagonal 450 of the synaptic weight matrix S. Each submatrix $S_{sub}$ is implemented using a corresponding core circuit 10. Therefore, each submatrix $S_{sub}$ is an $A_x \times A_n$ block diagonal matrix. If the computing system comprises C core circuits 10, the synaptic weight matrix S comprises C submatrices $S_{sub}$.

In one embodiment, a submatrix $S_{sub}$ implemented by a core circuit 10 is represented by equation (15) provided below:

$$S_{sub} = (GB) \otimes W \tag{15},$$

wherein $\otimes$ denotes a Hadamard product, wherein G is an $A_x \times K$ permutation matrix representing an axon type for each axon 15 of the core circuit 10, wherein B is a $K \times A_n$ matrix representing effective synaptic strengths for each axon type for each neuron 11 of the core circuit 10, and wherein W is a $A_x \times A_n$ binary matrix representing a synaptic connection between each neuron 11 and each axon 15 of the core circuit 10.

Each column of the matrix G corresponds to a specific axon type. An entry of 1 in the $i^{th}$ row and the $k^{th}$ column of the matrix G denotes that the $i^{th}$ axon of the core circuit 10 has corresponding axon type k, wherein $k \in \{0, 1, 2, \ldots, K\}$. In one embodiment, K=3 and $A_x=A_n=256$. An example $A_x \times K$ matrix G, as represented in form (16), is provided below:

$$G = \begin{bmatrix} 0 & 1 & 0 & 0 \\ 0 & 0 & 1 & 0 \\ 0 & 1 & 0 & 0 \\ 0 & 0 & 0 & 1 \\ 1 & 0 & 0 & 0 \\ 0 & 1 & 0 & 0 \\ 1 & 0 & 0 & 0 \\ \ldots & & & \end{bmatrix}, \quad (16)$$

wherein a first column of the matrix G corresponds to a first axon type 0, wherein a second column of the matrix G corresponds to a second axon type 1, wherein a third column of the matrix G corresponds to a third axon type 2, and wherein a fourth column of the matrix G corresponds to a fourth axon type 2.

Each row of the matrix B corresponds to a specific axon type. Each column of the matrix B corresponds to a neuron 11 of the core circuit 10. Each $kj^{th}$ entry of the matrix B is a scalar number that defines/sets an effective synaptic strength for a $j^{th}$ neuron 11 for an axon type k, wherein $k \in \{0, 1, 2, \ldots, K\}$ An example $K \times A_n$ matrix B, as represented in form (17), is provided below:

$$B = \begin{pmatrix} S_0^0 & S_1^0 & S_2^0 & \ldots & S_{255}^0 \\ S_0^1 & S_1^1 & S_2^1 & \ldots & S_{255}^1 \\ S_0^2 & S_1^2 & S_2^2 & \ldots & S_{255}^2 \\ S_0^3 & S_1^3 & S_2^3 & \ldots & S_{255}^3 \end{pmatrix}, \quad (17)$$

wherein a first row of the matrix B corresponds to a first axon type 0, wherein a second row of the matrix B corresponds to a second axon type 1, wherein a third row of the matrix B corresponds to a third axon type 2, and wherein a fourth row of the matrix B corresponds to a fourth axon type 2.

Each $ij^{th}$ entry of the matrix W represents a synaptic connection between an $i^{th}$ axon 15 and a $j^{th}$ neuron 11 of the core circuit 10. An example $A_n \times A_n$ matrix W, as represented in form (18), is provided below:

$$W = \begin{bmatrix} 0 & 1 & 0 & 0 & 1 & 1 & 1 & 0 & \ldots \\ 0 & 0 & 1 & 0 & 0 & 0 & 1 & 1 & \ldots \\ 0 & 1 & 0 & 0 & 0 & 1 & 0 & 0 & \ldots \\ 0 & 0 & 0 & 1 & 1 & 1 & 0 & 0 & \ldots \\ 1 & 0 & 0 & 0 & 1 & 0 & 1 & 0 & \ldots \\ 0 & 1 & 0 & 0 & 0 & 1 & 1 & 1 & \ldots \\ 1 & 0 & 0 & 0 & 0 & 0 & 0 & 0 & \ldots \\ \ldots & & & & & & & & \end{bmatrix}. \quad (18)$$

A delay permutation matrix D for a computing system represents a time delay for each system input and each axon input of the computing system. A matrix $D^T$, represented in the form (19) provided below, denotes a transpose of an example delay permutation matrix D:

$$D^T = \begin{bmatrix} 1 & 0 & 0 & 0 & 0 & 0 & 0 & \ldots \\ 0 & 1 & 0 & 0 & 0 & 0 & 0 & \ldots \\ 0 & 0 & 0 & 1 & 0 & 0 & 0 & \ldots \\ 0 & 0 & 0 & 0 & 0 & 1 & 0 & \ldots \\ 0 & 0 & 0 & 0 & 1 & 0 & 0 & \ldots \\ 0 & 0 & 0 & 0 & 0 & 0 & 1 & \ldots \\ 0 & 0 & 1 & 0 & 0 & 0 & 0 & \ldots \\ \ldots & & & & & & & \end{bmatrix}. \quad (19)$$

Each $ji^{th}$ entry of the matrix $D^T$ that is 1 maps the $i^{th}$ input to the $j^{th}$ output. In one embodiment, a delay unit 230/430 implements mapping. An example mapping of a first vector $V_1$ to a second vector $V_2$ using the matrix $D^T$ is provided by equation (20) provided below:

$$D^T V_1 = V_2 \qquad (20)$$

$$= \begin{bmatrix} 1 & 0 & 0 & 0 & 0 & 0 & 0 & \ldots \\ 0 & 1 & 0 & 0 & 0 & 0 & 0 & \ldots \\ 0 & 0 & 0 & 1 & 0 & 0 & 0 & \ldots \\ 0 & 0 & 0 & 0 & 0 & 1 & 0 & \ldots \\ 0 & 0 & 0 & 0 & 1 & 0 & 0 & \ldots \\ 0 & 0 & 0 & 0 & 0 & 0 & 1 & \ldots \\ 0 & 0 & 1 & 0 & 0 & 0 & 0 & \ldots \\ \ldots & & & & & & & \end{bmatrix} \begin{bmatrix} [X_t+1] \\ [\Delta 1] \\ [\Delta 2] \\ \vdots \end{bmatrix} = \begin{bmatrix} [\Delta 1] \\ [\Delta 2] \\ \vdots \\ [X_d] \end{bmatrix},$$

wherein the first vector $V_1$ is a $N_x*A_d \times 1$ vector representing an axon input vector $X_{t+1}$ concatenated with a delay buffer vector $d_t$, and wherein the second vector $V_2$ is a $N_x*A_d \times 1$ vector representing a delay buffer vector $d_{t+1}$ concatenated with the vector $X_d$. Each delay buffer vector $d_t$, $d_{t+1}$ comprises multiple $N_x \times 1$ subvectors, wherein each subvector corresponds to a specific time delay (e.g., time delay $\Delta 1$, time delay $\Delta 2$, ...). Generally, each time delay $\Delta h$ maps to time delay $\Delta(h+1)$, wherein h is a positive integer. An entry of the axon input vector $X_{t+1}$, however, may map to any time delay $\Delta h$ or an entry of the vector $X_d$. If the matrix $D^T$ is an identity matrix, the axon input vector $X_{t+1}$ will be delayed by $A_d$ time steps.

Figure 9B:
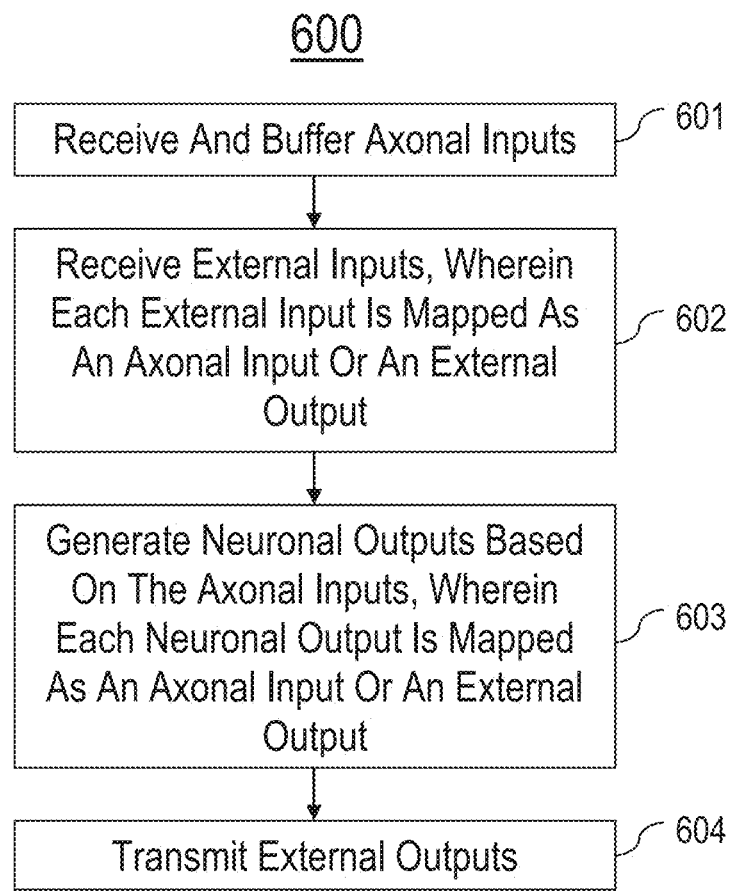
FIG. 9B illustrates a flowchart of an example process for computing computational functions, in accordance with an embodiment of the invention.

FIG. 9B illustrates a flowchart of an example process 600 for computing computational functions, in accordance with an embodiment of the invention. In process block 601, receive and buffer axonal inputs. In process block 602, receive external inputs, wherein each external input is mapped as an axonal input or an external output. In process block 603, generate neuronal outputs by performing a set of computations based on the axonal inputs, wherein each neuronal output is mapped as an axonal input or an external output. In process block 604, transmit external outputs.

Figure 10:
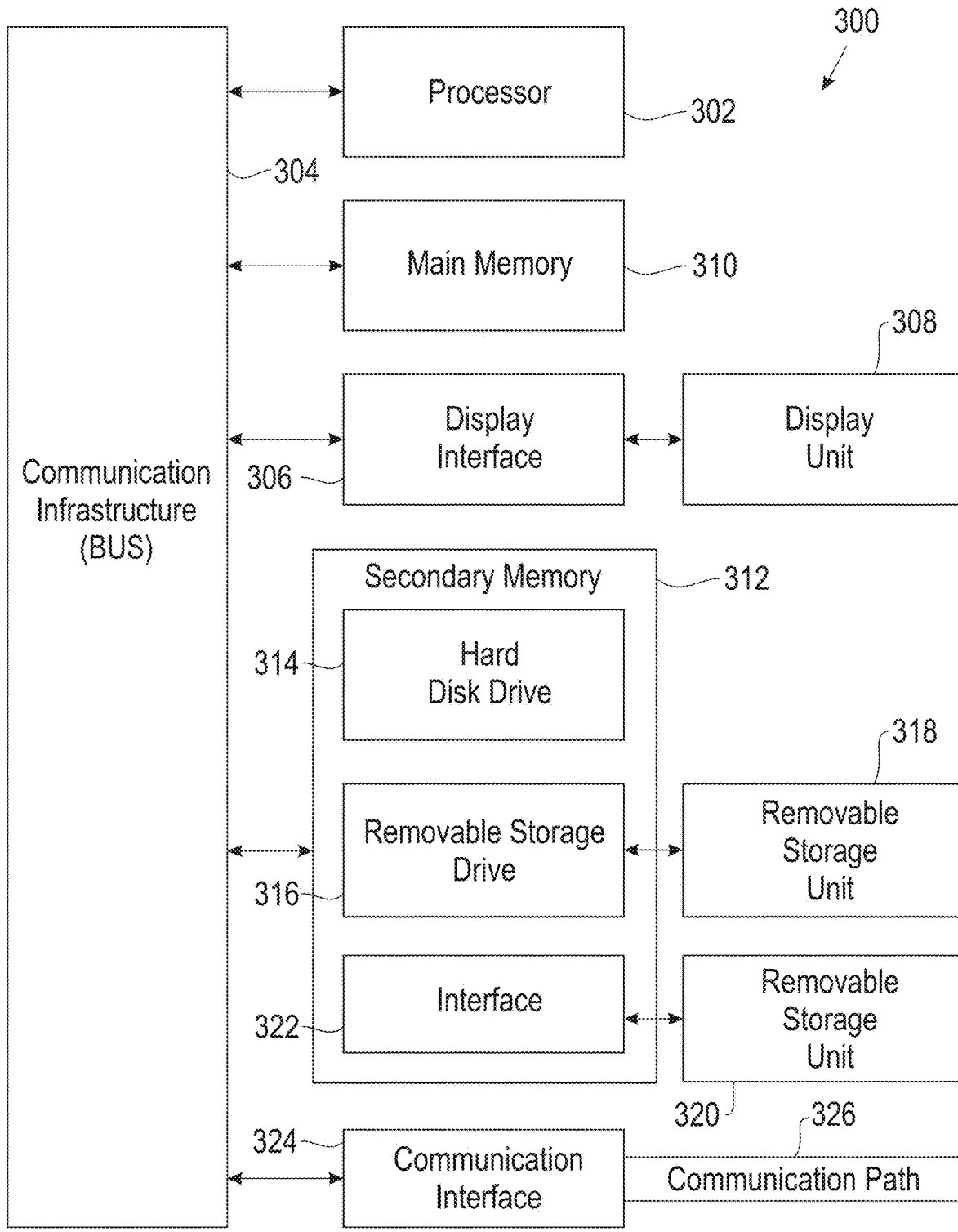
FIG. 10 is a high level block diagram showing an information processing system useful for implementing one embodiment of the present invention.

FIG. 10 is a high level block diagram showing an information processing system 300 useful for implementing one embodiment of the present invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the communication infrastructure 304 (or from a frame buffer not shown) for display on a display unit 308. The computer system also includes a main memory 310, preferably random access memory, and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

In this document, the terms "computer program medium," "computer usable medium," and "computer readable medium" are used to generally refer to media such as main memory 310 and secondary memory 312, removable storage drive 316, and a hard disk installed in hard disk drive 314.

Computer programs (also called computer control logic) are stored in main memory 310 and/or secondary memory 312. Computer programs may also be received via communication interface 324. Such computer programs, when run, enable the computer system to perform the features of the present invention as discussed herein. In particular, the computer programs, when run, enable the processor 302 to perform the features of the computer system. Accordingly, such computer programs represent controllers of the computer system.

From the above description, it can be seen that the present invention provides a system, computer program product, and method for implementing the embodiments of the invention. The present invention further provides a non-transitory computer-useable storage medium for performing a specialized class of neuronal computation and non-neuronal computation. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A neurosynaptic system comprising:
 a neural computation unit comprising multiple electronic neurons, multiple electronic axons, and a plurality of electronic synapse devices interconnecting the multiple electronic neurons with the multiple electronic axons, wherein the neural computation unit is configured to perform a set of computations based on one or more axonal inputs and a first neural computation matrix to generate one or more neuronal outputs;
 a scheduler delay buffer configured to receive and buffer the one or more axonal inputs; and
 a packet router configured to:
  receive one or more external inputs from an environment external to the neurosynaptic system, each external input comprising a sensory input;
  transmit one or more external outputs to the environment external to the neurosynaptic system, each external output comprising a motor output;
  selectively route the one or more external inputs based on a first routing permutation matrix, each external input routed to one of: the scheduler delay buffer as one of the one or more axonal inputs, or the environment external to the neurosynaptic system as one of the one or more external outputs; and
  selectively route the one or more neuronal outputs based on the first routing permutation matrix, each neuronal output routed to one of: the scheduler delay buffer as an axonal input, or the environment external to the neurosynaptic system as one or the one or more external outputs;

wherein the first neural computation matrix represents a concatenation of multiple neural computation matrices implemented by multiple layers of neurosynaptic core circuits;

wherein the first routing permutation matrix represents a concatenation of multiple routing permutation matrices implemented by the multiple layers; and wherein the multiple layers is a hybrid of a fully feed-forward configuration and a fully recurrent configuration.

2. The neurosynaptic system of claim 1, wherein:
each neurosynaptic core circuit comprises multiple electronic neurons, multiple electronic axons, and a plurality of electronic synapse devices interconnecting the multiple neurons with the multiple axons.

3. The neurosynaptic system of claim 2, wherein each layer further comprises an interconnection network that interconnects neurosynaptic core circuits of the layer.

4. The neurosynaptic system of claim 3, wherein:
each neuronal output represents a neural firing of a neuron.

5. The neurosynaptic system of claim 4, wherein:
the packet router enables inter-core routing.

6. The neurosynaptic system of claim 4, wherein:
the scheduler delay buffer maintains at least one axonal input for a pre-determined time delay.

7. The neurosynaptic system of claim 1, wherein:
the set of computations comprise a hybrid of feed-forward computations and recurrent computations;
the packet router is configured to:
  implement one-to-one mapping if a first sum of a total number of axonal inputs buffered by the scheduler delay buffer and a total number of external outputs transmitted by the packet router is equal to a second sum of a total number of neuronal outputs generated and a total number of externals inputs received by the packet router;
  implement routing fan-out if the first sum of the total number of axonal inputs buffered and the total number of external outputs transmitted is greater than the second sum of the total number of neuronal outputs generated and the total number of externals inputs received; and
  implement routing fan-in if the first sum of the total number of axonal inputs buffered and the total number of external outputs transmitted is less than the second sum of the total number of neuronal outputs generated and the total number of externals inputs received.

8. The neurosynaptic system of claim 1, wherein:
the set of computations include at least one of an auto-regressive function, a linear function, and a non-linear function.

9. The neurosynaptic system of claim 1, wherein:
the multiple layers are interconnected.

10. A method comprising:
receiving and buffering one or more axonal inputs in a scheduler delay buffer of a neurosynaptic system;
generating one or more neuronal outputs by performing a set of computations based on the one or more axonal inputs and a first neural computation matrix utilizing a neural computation unit of the neurosynaptic system, wherein the neural computation unit comprises multiple electronic neurons, multiple electronic axons, and a plurality of electronic synapse devices interconnecting the multiple electronic neurons with the multiple electronic axons;

receiving, via a packet router of the neurosynaptic system, one or more external inputs from an environment external to the neurosynaptic system, wherein each external input comprises a sensory input;

transmitting, via the packet router, one or more external outputs to the environment external to the neurosynaptic system, wherein each external output comprises a motor output;

selectively routing, via the packet router, the one or more external inputs based on a first routing permutation matrix, wherein each external input is routed to one of: the scheduler delay buffer as one of the one or more axonal inputs, or the environment external to the neurosynaptic system as one of the one or more external outputs; and selectively routing, via the packet router, the one or more neuronal outputs based on the first routing permutation matrix, wherein each neuronal output is routed to one of: the scheduler delay buffer as an axonal input, or the environment external to the neurosynaptic system as one or the one or more external outputs;

wherein the first neural computation matrix represents a concatenation of multiple neural computation matrices implemented by multiple layers of neurosynaptic core circuits;

wherein the first routing permutation matrix represents a concatenation of multiple routing permutation matrices implemented by the multiple layers; and wherein the multiple layers is a hybrid of a fully feed-forward configuration and a fully recurrent configuration.

11. The method of claim 10, wherein:
each neurosynaptic core circuit comprises multiple electronic neurons, multiple electronic axons, and a plurality of electronic synapse devices interconnecting the multiple neurons with the multiple axons.

12. The method of claim 11, wherein:
each layer further comprises an interconnection network that interconnects neurosynaptic core circuits of the layer; and
each neuronal output represents a neural firing of a neuron.

13. The method of claim 12, wherein:
the packet router enables inter-core routing.

14. The method of claim 12, wherein:
the scheduler delay buffer maintains at least one axonal input for a pre-determined time delay.

15. The method of claim 10, wherein:
the set of computations comprise a hybrid of feed-forward computations and recurrent computations;
the packet router is configured to:
  implement one-to-one mapping if a first sum of a total number of axonal inputs buffered by the scheduler delay buffer and a total number of external outputs transmitted by the packet router is equal to a second sum of a total number of neuronal outputs generated and a total number of externals inputs received by the packet router;
  implement routing fan-out if the first sum of the total number of axonal inputs buffered and the total number of external outputs transmitted is greater than the second sum of the total number of neuronal outputs generated and the total number of externals inputs received; and implement routing fan-in if the first sum of the total number of axonal inputs buffered and the total number of external outputs transmitted is less than the second sum of the total number of neuronal outputs generated and the total number of externals inputs received.

16. A computer program product for computing computational functions, the computer program product comprising a non-transitory computer-readable storage medium having program code embodied therewith, the program code being executable by a computer to:

receiving and buffering one or more axonal inputs in a scheduler delay buffer of a neurosynaptic system;

generating one or more neuronal outputs by performing a set of computations based on the one or more axonal inputs and a first neural computation matrix utilizing a neural computation unit of the neurosynaptic system, wherein the neural computation unit comprises multiple electronic neurons, multiple electronic axons, and a plurality of electronic synapse devices interconnecting the multiple electronic neurons with the multiple electronic axons;

receiving, via a packet router of the neurosynaptic system, one or more external inputs from an environment external to the neurosynaptic system, wherein each external input comprises a sensory input;

transmitting, via the packet router, one or more external outputs to the environment external to the neurosynaptic system, wherein each external output comprises a motor output;

selectively routing, via the packet router, the one or more external inputs based on a first routing permutation matrix, wherein each external input is routed to one of: the scheduler delay buffer as one of the one or more axonal inputs, or the environment external to the neurosynaptic system as one of the one or more external outputs; and selectively routing, via the packet router, the one or more neuronal outputs based on the first routing permutation matrix, wherein each neuronal output is routed to one of: the scheduler delay buffer as an axonal input, or the environment external to the neurosynaptic system as one or the one or more external outputs;

wherein the first neural computation matrix represents a concatenation of multiple neural computation matrices implemented by multiple layers of neurosynaptic core circuits;

wherein the first routing permutation matrix represents a concatenation of multiple routing permutation matrices implemented by the multiple layers; and wherein the multiple layers is a hybrid of a fully feed-forward configuration and a fully recurrent configuration.

* * * * *